United States Patent
Yamada (10) Patent No.: US 11,628,563 B2
(45) Date of Patent: Apr. 18, 2023

(54) CONTROL METHOD AND ROBOT SYSTEM

(71) Applicant: Seiko Epson Corporation, Tokyo (JP)

(72) Inventor: Yoshihito Yamada, Chino (JP)

(73) Assignee: SEIKO EPSON CORPORATION

( * ) Notice: Subject to any disclaimer, the term of this patent is extended or adjusted under 35 U.S.C. 154(b) by 196 days.

(21) Appl. No.: 17/118,910

(22) Filed: Dec. 11, 2020

(65) Prior Publication Data

US 2021/0178577 A1     Jun. 17, 2021

(30) Foreign Application Priority Data

Dec. 13, 2019    (JP) .............................. JP2019-225198

(51) Int. Cl.
     *B25J 9/16*           (2006.01)

(52) U.S. Cl.
     CPC ............. *B25J 9/163* (2013.01); *B25J 9/1694* (2013.01)

(58) Field of Classification Search
     CPC ........ B25J 9/163; B25J 9/1694; B25J 9/1656; B25J 9/1602; B25J 9/0081; B25J 13/088; B25J 13/086; G05B 19/42; G05B 2219/39438; G05B 2219/39242; G05B 2219/40598

See application file for complete search history.

(56) References Cited

U.S. PATENT DOCUMENTS

| | | | |
|---|---|---|---|
| 5,937,143 A | 8/1999 | Watanabe et al. | |
| 2006/0108960 A1 | 5/2006 | Tanaka et al. | |
| 2014/0067121 A1* | 3/2014 | Brooks | B25J 9/1676 700/255 |
| 2015/0306766 A1* | 10/2015 | Jonsson | B25J 9/1656 700/245 |
| 2017/0066129 A1* | 3/2017 | Motoyoshi | B25J 9/1615 |
| 2018/0333849 A1* | 11/2018 | Sugio | B25J 9/0093 |

FOREIGN PATENT DOCUMENTS

| | | |
|---|---|---|
| JP | 2004-243427 A | 9/2004 |
| JP | 2006-142480 A | 6/2006 |
| WO | 2004-009303 A1 | 1/2004 |

\* cited by examiner

*Primary Examiner* — Bhavesh V Amin
*Assistant Examiner* — Esvinder Singh
(74) *Attorney, Agent, or Firm* — Harness, Dickey & Pierce, P.L.C.

(57) ABSTRACT

A control method for a robot system having a robot arm and executing an operation mode of the robot arm having an execution mode in which a motion program is executed and a teaching mode in which the motion program is taught, includes setting an upper limit velocity of a motion velocity of the robot arm to a first velocity when the operation mode is the execution mode, and setting the upper limit velocity to a second velocity lower than the first velocity when the operation mode is the teaching mode.

11 Claims, 5 Drawing Sheets

CONTROL METHOD AND ROBOT SYSTEM

The present application is based on, and claims priority from JP Application Serial Number 2019-225198, filed Dec. 13, 2019, the disclosure of which is hereby incorporated by reference herein in its entirety.

BACKGROUND

1. Technical Field

The present disclosure relates to a control method and a robot system.

2. Related Art

Recently, in factories, due to labor cost rise and labor shortage, work manually performed in the past has been increasingly automated by various robots and robot peripherals. As the various robots and the robot peripherals, for example, a robot apparatus as shown in JP-A-2006-142480 is known.

The robot apparatus of JP-A-2006-142480 includes entry detecting means for detecting entry of a human into a movable range of a robot. When the human approaches the robot, the possibility of a collision between the human and the robot is reduced by reduction of the motion velocity of the robot.

However, in the robot apparatus of JP-A-2006-142480, the motion velocity of the robot is lower at each time when the human approaches the robot, and thereby, work efficiency of the robot becomes lower.

SUMMARY

The present disclosure has been achieved to solve at least a part of the above described problem and can be realized as below.

A control method according to an application example is a control method for a robot system having a robot arm and executing an operation mode of the robot arm having an execution mode in which a motion program is executed and a teaching mode in which the motion program is taught, including setting an upper limit velocity of a motion velocity of the robot arm to a first velocity when the operation mode is the execution mode, and setting the upper limit velocity to a second velocity lower than the first velocity when the operation mode is the teaching mode.

A robot system according to an application example includes a robot arm, a drive control unit that controls driving of the robot arm based on an operation mode executed by the robot arm, and a velocity setting unit that sets an upper limit velocity of a motion velocity of the robot arm based on the operation mode, wherein the velocity setting unit sets the upper limit velocity to a first velocity when the operation mode is an execution mode in which a motion program is executed, and sets the upper limit velocity to a second velocity lower than the first velocity when the operation mode is a teaching mode in which the motion program is taught to a robot.

DESCRIPTION OF EXEMPLARY EMBODIMENTS

As below, a control method and a robot system according to the present disclosure will be explained in detail based on preferred embodiments shown in the accompanying drawings.

First Embodiment

Figure 1:
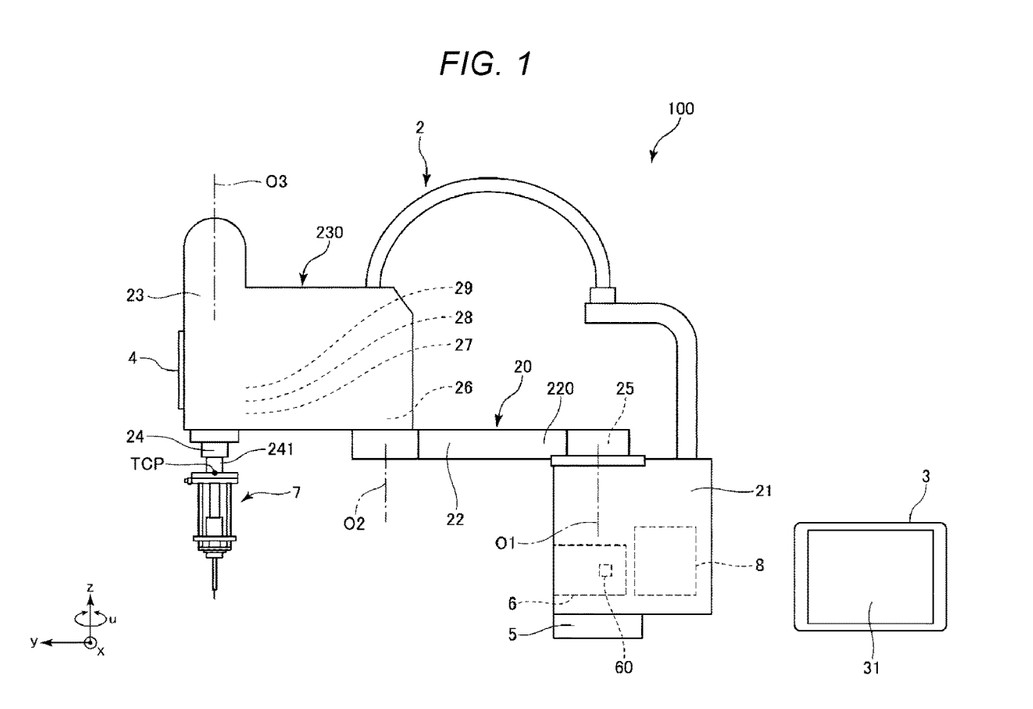
FIG. 1 is a schematic configuration diagram of a robot system according to the present disclosure.
Figure 2:
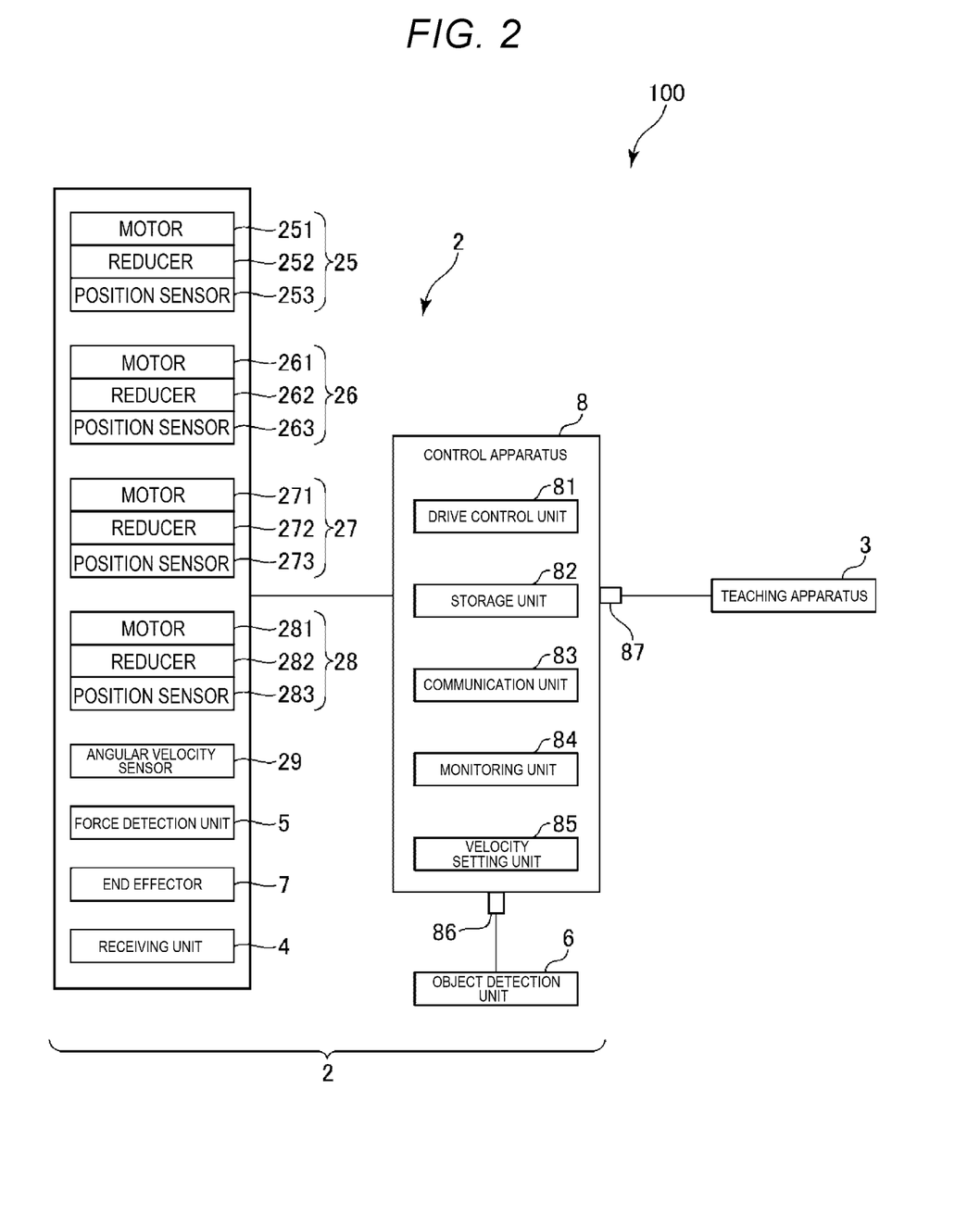
FIG. 2 is a functional block diagram of the robot system shown in FIG. 1.
Figure 3:
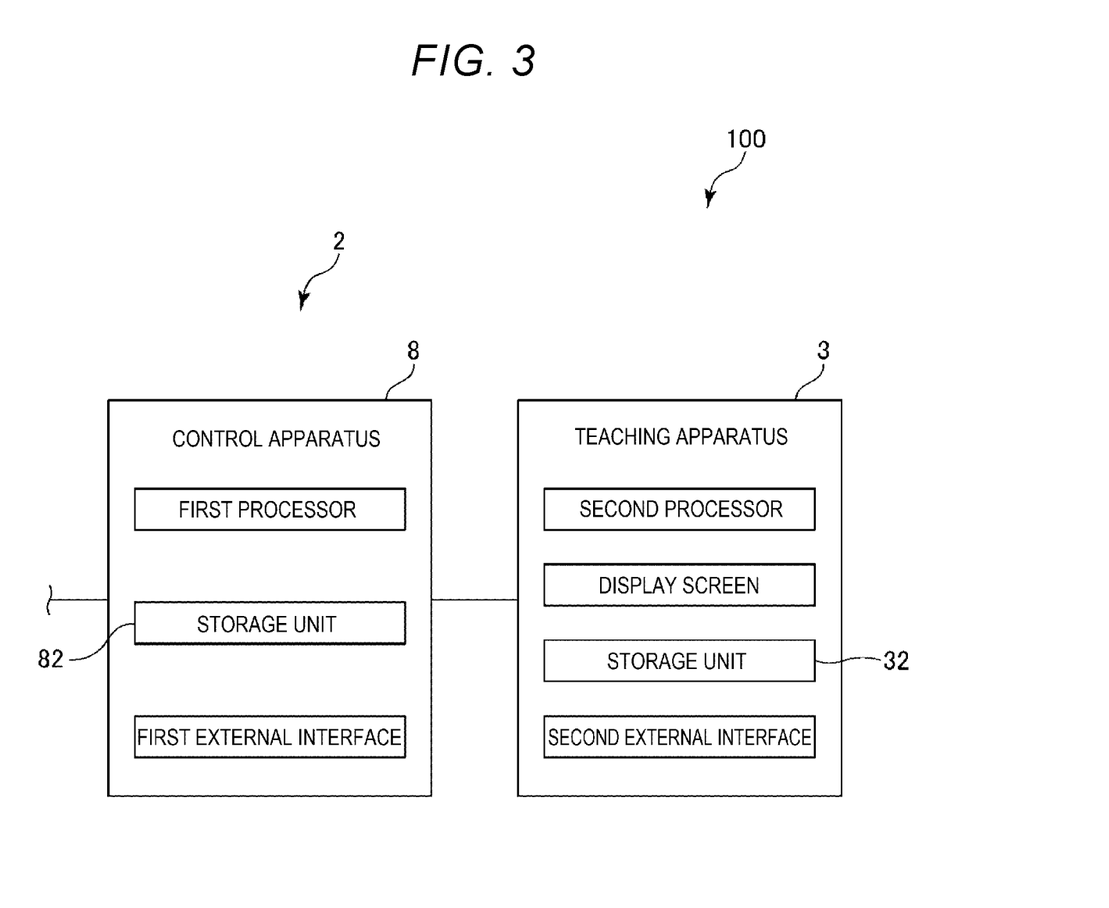
FIG. 3 is a block diagram showing a configuration example of hardware of the robot system shown in FIG. 2.
Figure 4:
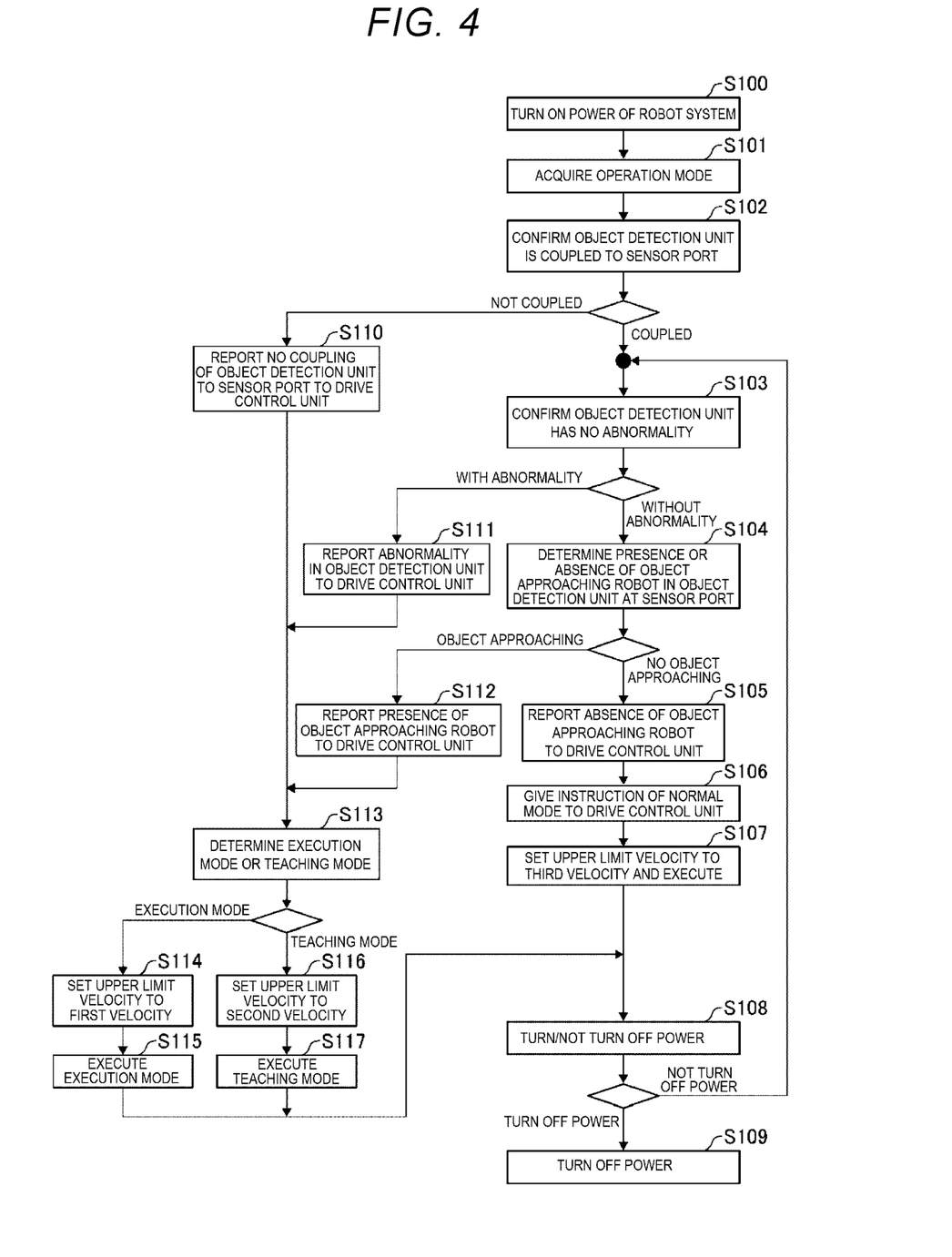
FIG. 4 is a flowchart for explanation of a control method according to the present disclosure.
Figure 5:
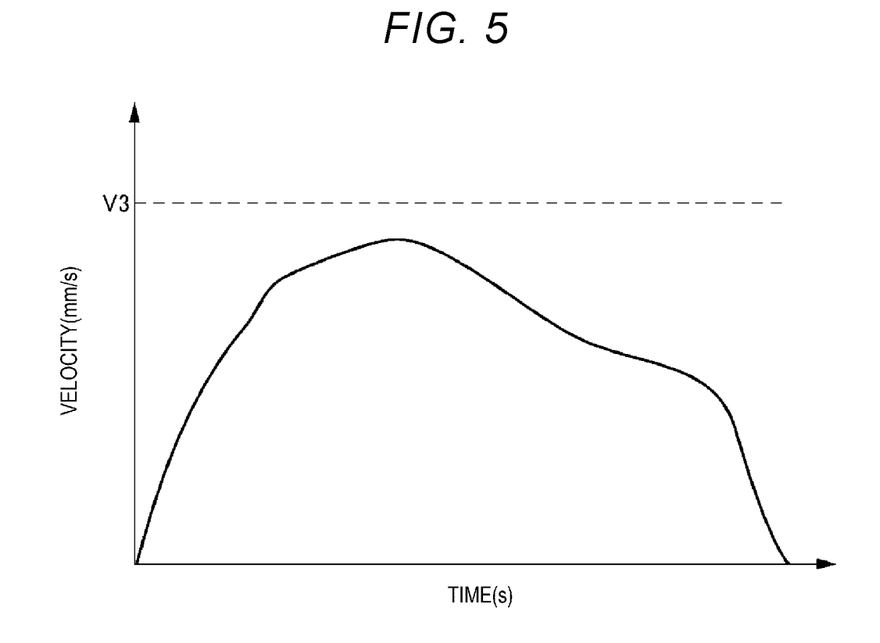
FIG. 5 is a graph showing a motion of a robot arm and having a vertical axis indicating a velocity and a horizontal axis indicating time.
Figure 6:
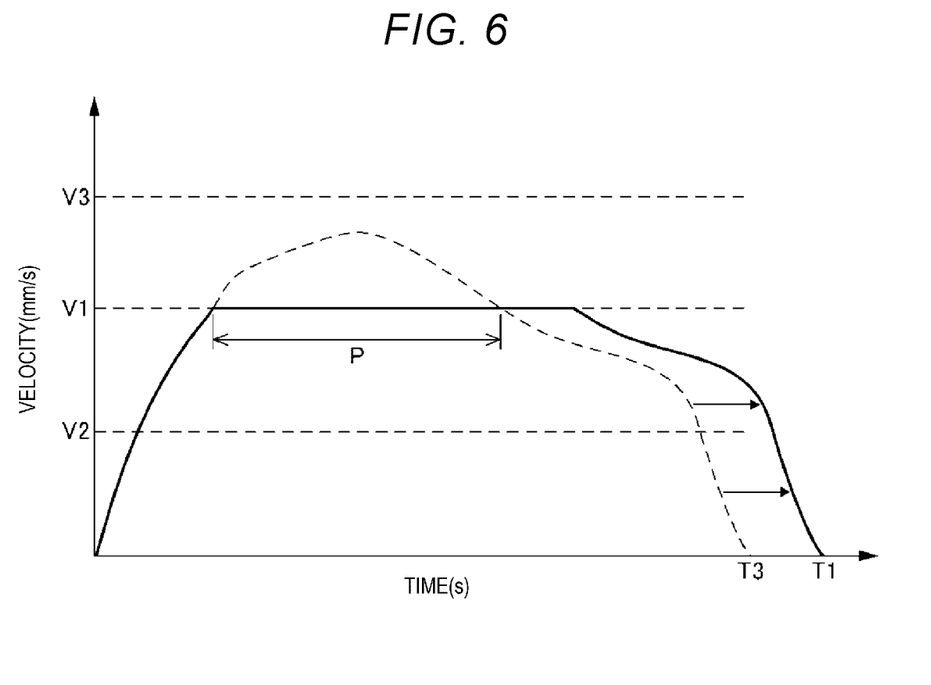
FIG. 6 is a graph showing a motion of the robot arm and having a vertical axis indicating the velocity and a horizontal axis indicating time.

FIG. 1 is a schematic configuration diagram of a robot system according to the present disclosure. FIG. 2 is a functional block diagram of the robot system shown in FIG. 1. FIG. 3 is a block diagram showing a configuration example of hardware of the robot system shown in FIG. 2. FIG. 4 is a flowchart for explanation of a control method according to the present disclosure. FIG. 5 is a graph showing a motion of a robot arm and having a vertical axis indicating a velocity and a horizontal axis indicating time. FIG. 6 is a graph showing a motion of the robot arm and having a vertical axis indicating the velocity and a horizontal axis indicating time.

In FIG. 1, for convenience of explanation, an x-axis, a y-axis, and a z-axis are shown as three axes orthogonal to one another. Hereinafter, directions parallel to the x-axis are also referred to as "x-axis directions", directions parallel to the y-axis are also referred to as "y-axis directions", and directions parallel to the z-axis are also referred to as "z-axis directions". Further, hereinafter, the pointer sides of the respective arrows in the drawings are referred to as "+(plus)" and the tail sides are referred to as "−(minus)". Furthermore, directions about the z-axis and directions about an axis parallel to the z-axis are also referred to as "u directions".

Hereinafter, for convenience of explanation, the +z-axis direction, i.e., the upside in FIG. 1 is also referred to as "upper" or "above" and the −z-axis direction, i.e., the downside is also referred to as "lower" or "below". Further, with respect to a robot arm 20, a base 21 side in FIG. 1 is referred to as "proximal end" and the opposite side, i.e., an end effector 7 side is referred to as "distal end". Furthermore, the z-axis directions, i.e., upward and downward directions in FIG. 1 are referred to as "vertical directions" and the x-axis directions and the y-axis directions, i.e., leftward and rightward directions are referred to as "horizontal directions".

A robot system 100 shown in FIGS. 1 and 2 is used for work of e.g. holding, transport, assembly, inspection, etc. of workpieces including electronic components and electronic apparatuses. The robot system 100 includes a robot 2 and a teaching apparatus 3 that teaches a motion program to the robot 2. The robot 2 and the teaching apparatus 3 can communicate via wired or wireless connection and the communication may be made via a network such as the Internet.

Teaching refers to designation of a motion program for the robot 2 and specifically refers to input of a position and a posture of the robot arm 20 to a control apparatus 8. The teaching includes direct teaching and indirect teaching.

The direct teaching refers to storage of the position and the posture of the robot arm 20 in the control apparatus 8 or the teaching apparatus 3, i.e., creation of a motion program by moving the robot arm 20 into predetermined position and posture while applying an external force to the robot arm 20 and operating a teaching button of a receiving unit 4 at a desired time.

Further, the indirect teaching refers to creation of a motion program using the teaching apparatus 3, which will be described later, and storage of the program in a storage unit 82 of the control apparatus 8 or a storage unit of the teaching apparatus 3.

First, the robot 2 is explained.

The robot 2 is a horizontal articulated robot, i.e., a scalar robot in the illustrated configuration. As shown in FIG. 1, the robot 2 includes a base 21, the robot arm 20 coupled to the base 21, the receiving unit 4 that receives a predetermined operation from an operator, a force detection unit 5, an end effector 7, and the control apparatus 8 that controls actuation of these respective units.

The base 21 is a part supporting the robot arm 20. In the base 21, the control apparatus 8, which will be described later, is provided. Further, in an arbitrary portion of the base 21, the origin of the robot coordinate system is set.

The robot arm 20 includes a first arm 22, a second arm 23, and a third arm 24 as a working head. Note that the robot 2 is not limited to the illustrated configuration, but the number of arms may be one, two, four, or more.

Further, the robot 2 includes a drive unit 25 that rotates the first arm 22 relative to the base 21, a drive unit 26 that rotates the second arm 23 relative to the first arm 22, a u-drive unit 27 that rotates a shaft 241 of the third arm 24 relative to the second arm 23, a z-drive unit 28 that moves the shaft 241 in the z-axis directions relative to the second arm 23, and an angular velocity sensor 29.

As shown in FIGS. 1 and 2, the drive unit 25 is provided inside of a housing 220 of the first arm 22 and has a motor 251 that generates a drive force, a reducer 252 that reduces the drive force of the motor 251, and a position sensor 253 that detects the rotation angle of the rotation shaft of the motor 251 or the reducer 252.

The drive unit 26 is provided inside of a housing 230 of the second arm 23 and has a motor 261 that generates a drive force, a reducer 262 that reduces the drive force of the motor 261, and a position sensor 263 that detects the rotation angle of the rotation shaft of the motor 261 or the reducer 262.

The u-drive unit 27 is provided inside of the housing 230 of the second arm 23 and has a motor 271 that generates a drive force, a reducer 272 that reduces the drive force of the motor 271, and a position sensor 273 that detects the rotation angle of the rotation shaft of the motor 271 or the reducer 272.

The z-drive unit 28 is provided inside of the housing 230 of the second arm 23 and has a motor 281 that generates a drive force, a reducer 282 that reduces the drive force of the motor 281, and a position sensor 283 that detects the rotation angle of the rotation shaft of the motor 281 or the reducer 282.

As the motor 251, the motor 261, the motor 271, and the motor 281, e.g. servo motors such as AC servo motors or DC servo motors may be used.

As the reducer 252, the reducer 262, the reducer 272, and the reducer 282, e.g. planet gear reducers, wave gearings, or the like may be used. Further, as the position sensor 253, the position sensor 263, the position sensor 273, and the position sensor 283, e.g. angle sensors may be used.

The drive unit 25, the drive unit 26, the u-drive unit 27, and the z-drive unit 28 are respectively coupled to corresponding motor drivers (not shown) and controlled by a drive control unit 81 of the control apparatus 8 via the motor drivers.

As shown in FIG. 2, the angular velocity sensor 29 is provided inside of the second arm 23. Accordingly, the sensor may detect the angular velocity of the second arm 23. The control apparatus 8 performs control of the robot 2 based on information of the detected angular velocity.

The base 21 is fixed to e.g. a floor surface (not shown) by bolts or the like. The first arm 22 is coupled to the upper end portion of the base 21. The first arm 22 is rotatable about a first axis O1 along the vertical directions relative to the base 21. When the drive unit 25 that rotates the first arm 22 drives, the first arm 22 rotates within a horizontal plane in the u-directions, i.e., about the first axis O1 relative to the base 21. The position sensor 253 is configured to detect the amount of rotation of the first arm 22 relative to the base 21.

The second arm 23 is coupled to the distal end portion of the first arm 22. The second arm 23 is rotatable in the u-directions, i.e., about a second axis O2 along the vertical directions relative to the first arm 22. The axial direction of the first axis O1 and the axial direction of the second axis O2 are the same. That is, the second axis O2 is parallel to the first axis O1. When the drive unit 26 that rotates the second arm 23 drives, the second arm 23 rotates within a horizontal plane about the second axis O2 relative to the first arm 22. The position sensor 263 is configured to detect the amount of driving, specifically, the amount of rotation of the second arm 23 relative to the first arm 22.

The third arm 24 is placed and supported in the distal end portion of the second arm 23. The third arm 24 has the shaft 241. The shaft 241 is rotatable about a third axis O3 along the vertical directions and movable in the z-axis directions, i.e., the upward and downward directions relative to the second arm 23. The shaft 241 is the arm at the most distal end of the robot arm 20.

When the u-drive unit 27 that rotates the shaft 241 drives, the shaft 241 rotates about the z-axis. Further, the position sensor 273 is configured to detect the amount of rotation of the shaft 241 relative to the second arm 23.

When the z-drive unit 28 that moves the shaft 241 in the z-axis directions drives, the shaft 241 moves in the upward and downward directions, i.e., the z-axis directions. Further, the position sensor 283 is configured to detect the amount of movement of the shaft 241 in the z-axis directions relative to the second arm 23.

Various end effectors are detachably coupled to the distal end portion of the shaft 241. The end effector is not particularly limited to, but includes e.g. one that grips an object to be transported, one that processes an object to be processed, and one used for inspection. In the embodiment, the end effector 7 is detachably coupled.

The end effector 7 is not a component element of the robot 2 in the embodiment, however, a part or entire of the end effector 7 may be a component element of the robot 2.

As shown in FIG. 1, the force detection unit 5 detects a force applied to the robot 2, i.e., a force applied to the robot arm 20 and the base 21. In the embodiment, the force detection unit 5 is provided at the downside of the base 21 and supports the base 21 from the downside.

The force detection unit 5 may include e.g. a plurality of elements formed using a piezoelectric material such as quartz crystal and outputting electric charge when subjected to an external force. The control apparatus 8 may perform conversion into an external force applied to the robot arm 20 according to the amounts of electric charge. Further, such a piezoelectric material can adjust the direction to generate the electric charge when subjected to the external force according to the direction in which the material is placed.

The receiving unit 4 is a part that receives the predetermined operation by the operator. The receiving unit 4 has a teaching button (not shown). The teaching button may be used when direct teaching is performed. The teaching button may be a mechanical button or touch-electric button. Further, another button having a different function may be placed around the teaching button.

As shown in FIG. 1, an object detection unit 6 is a sensor that detects an object such as a human approaching the robot 2. The object detection unit 6 includes e.g. an infrared sensor, a capacitive sensor, a millimeter-wave radar, a laser range sensor, and a camera. The object to be detected by the object detection unit 6 is an object except workpieces as working objects of the robot 2.

The object detection unit 6 is detachably coupled to a sensor port 86 as a coupling portion of the control apparatus 8. In a coupling state in which the object detection unit 6 is coupled to the sensor port 86, when an object approaches the robot 2, the unit transmits a signal representing the approach of the object to the control apparatus 8. Note that the coupling state refers to a state in which the object detection unit 6 and the control apparatus 8 can communicate and wired or wireless connection may be employed therefor. When the object detection unit 6 and the control apparatus 8 make wired communication, the part into which a connector of a signal line (not shown) is inserted is the sensor port 86 as the coupling portion. On the other hand, when the object detection unit 6 and the control apparatus 8 make wireless communication, the part that transmits and receives the signal is the coupling portion.

In the illustrated configuration, the object detection unit 6 is provided inside of the base 21. Note that the object detection unit 6 may be provided inside of the robot arm 20 or placed in a location apart from the base 21 and the robot arm 20 e.g. above, below, at a side, and around the robot arm 20. Further, the number of placed object detection units 6 is not particularly limited.

Further, an abnormality sensor 60 for detection as to whether or not an abnormality occurs in the object detection unit 6 is provided in the object detection unit 6. When an abnormality occurs in the object detection unit 6, the abnormality sensor 60 senses the abnormality and reports that to the control apparatus 8. Note that the abnormality includes an abnormality of an electric system of the object detection unit 6 or around and an abnormality of sensitivity of the detection sensor.

Next, the control apparatus 8 will be explained.

As shown in FIG. 1, the control apparatus 8 is provided inside of the base 21 in the embodiment. Further, as shown in FIG. 2, the control apparatus 8 has a function of controlling driving of the robot arm 20 and monitoring safety of the actuation state of the robot 2 and is electrically coupled to the respective parts of the robot 2. The control apparatus 8 includes the drive control unit 81, the storage unit 82, a communication unit 83, a monitoring unit 84, and a velocity setting unit 85.

These respective units are coupled communicably with one another. The control apparatus 8 further has the above described sensor port 86 and a coupling port 87 to which the teaching apparatus 3 is coupled.

The drive control unit 81 executes various programs etc. stored in the storage unit 82. Thereby, processing of the control of driving of the robot arm 20, various calculations, various determinations, etc. is realized.

The storage unit 82 stores the motion programs executed by the drive control unit 81. The motion programs are prepared for the respective works and stored to be updateable on an as-needed basis. Further, the storage unit 82 may be configured to store other data than the motion programs. The other data than the motion programs include e.g. setting information of the control apparatus 8.

The communication unit 83 communicates with the respective units of the robot 2 e.g. the angular velocity sensor 29, the force detection unit 5, the end effector 7, the receiving unit 4, the object detection unit 6, etc.

The monitoring unit 84 performs a coupling determination step of determining whether or not the coupling state in which the object detection unit 6 is coupled to the sensor port 86 as the coupling portion is provided prior to execution of a setting step, which will be described later. The method includes e.g. a method of transmitting an electric signal to the sensor port 86 by the monitoring unit 84 and making the determination based on whether or not the electric signal is returned from the object detection unit 6 and a method of making the determination based on whether or not a resistance value of a resistor (not shown) changes.

Then, the monitoring unit 84 reports the determination result to the drive control unit 81.

The velocity setting unit 85 sets an upper limit velocity of the motion velocity of the robot arm 20 based on an operation mode acquired from the teaching apparatus 3 by the coupling port 87 as an acquisition portion. That is, the upper limit velocity in the operation mode is determined according to the operation mode acquired by the coupling port 87 and stored in the storage unit 82. The operation mode acquired from the teaching apparatus 3 includes an execution mode and a teaching mode. This will be explained later in detail.

Note that the upper limit velocity of the robot arm 20 refers to an upper limit value of the velocity of the part moving fastest of the robot arm 20 during execution of the motion program. That is, the actuation of the robot arm 20 such that the motion velocity may not exceed the upper limit velocity refers to actuation of the robot arm 20 such that the velocity of the part moving fastest of the robot arm 20 may not exceed the upper limit velocity.

The part moving fastest of the robot arm is not particularly limited, but specifically refers to a control point TCP or joints of the robot arm 20, i.e., the coupling portion between the base 21 and the first arm 21 and the coupling portion between the first arm 21 and the second arm 23.

In the robot system 100, the upper limit velocity of at least one of these parts is set and the drive control unit 81 controls the actuation of the robot arm 20 so that the part may not exceed the upper limit velocity. The graphs in FIGS. 5 and 6 are the graphs showing the motion programs and the horizontal axes indicate time and the vertical axes indicate the velocity in the movement direction of the control point TCP. Note that, in the graph in FIG. 5, position information of the control point TCP is not considered. In a case where the motion program is performed, when the upper limit velocity is set to a third velocity V3, the motion program may be executed at the velocity set in the program. On the other hand, as shown in the graph in FIG. 6, when the upper limit velocity is a first velocity V1 lower than the third velocity V3, a partial program P in which the velocity of the control point TCP exceeds the first velocity V1 is rewritten by the velocity setting unit 85 so that the velocity may not exceed the first velocity V1, that is, the program may be executed at the first velocity V1 as the upper limit velocity. Thereby, the motion velocity of the control point TCP is restricted and safety is secured.

Note that the upper limit velocity is restricted to the first velocity V1 and the time taken for work is longer. That is, in the illustrated configuration, when a work is performed at the third velocity V3 as the upper limit velocity, the required time is time T3 and, when the work is performed at the first velocity V1 as the upper limit velocity, the required time is time T1 longer than the time T3. When the work is performed at the first velocity V1 as the upper limit velocity, the safety is increased by the difference in length of time. The relationship also holds between the first velocity V1 and a second velocity V2, which will be described later. As described above, the safety and the required time until the motion program is completed, i.e., the work efficiency have an inverse relation.

The drive control unit 81, the storage unit 82, the communication unit 83, the monitoring unit 84, and the velocity setting unit 85 may be mounted on different circuit boards from one another or several of the units may be mounted on the same circuit board. Note that these may be mounted in other forms than the circuit boards.

The function of the control apparatus 8 can be realized by e.g. the hardware configuration shown in FIG. 3.

The control apparatus 8 shown in FIG. 3 includes at least one first processor, a memory, i.e., the storage unit 82, and a first external interface communicably connected to one another.

The first processor of the control apparatus 8 includes e.g. a CPU (Central Processing Unit), an FPGA (Field-Programmable Gate Array), and an ASIC (Application Specific Integrated Circuit).

The storage unit 82 includes e.g. a volatile memory such as a RAM (Random Access Memory) and a nonvolatile memory such as a ROM (Read Only Memory). Note that the memory is not limited to the undetachable type, but may be a detachable external storage device.

The first external interface of the control apparatus 8 includes various communication connectors. As examples, the external interface includes a USB (Universal Serial bus) connector, an RS-232C connector, and a wired LAN (Local Area Network). Or, the external interface may be a transceiver that enables wireless communication such as a wireless LAN.

The control apparatus 8 may include another hardware component element in addition to the above described component elements.

Next, the teaching apparatus 3 will be explained.

As shown in FIGS. 1 to 3, the teaching apparatus 3 is a device for creating the motion program of the robot arm 20 and inputting various settings. As the teaching apparatus 3, a device e.g. a tablet, a personal computer, a smartphone, a teaching pendant, or the like may be used.

The teaching apparatus 3 is a tablet device in the illustrated configuration and has a display screen 31. The display screen 31 is a touch panel and also serves as an operation unit. An operator may select the execution mode or the teaching mode by operating the display screen 31. For example, the selection may be made by touching e.g. "execution mode button" or "teaching mode button" (not shown) displayed on the display screen 31.

The execution mode is a mode in which a predetermined motion program is reproduced, i.e., executed to drive the robot 2. The motion program executed in the execution mode includes a motion program taught by the teaching apparatus 3 and a motion program acquired via a network or the like.

As described above, the teaching mode has an indirect teaching mode in which teaching is performed using the teaching apparatus 3 and a direct teaching mode in which the operator performs teaching by applying an external force to the robot arm 20.

The operator creates and inputs the motion program of the robot 2 using the teaching apparatus 3 and stores the program in the storage unit 32 or the storage unit 82. Thereby, the above described indirect teaching mode is performed. Note that, for the indirect teaching, the operator may perform the teaching while visually recognizing the robot 2 in the vicinity of the robot 2 with the teaching apparatus 3 in the hand or in a remote location.

The function of the teaching apparatus 3 can be realized by e.g. the hardware configuration shown in FIG. 3.

The teaching apparatus 3 shown in FIG. 3 includes at least one second processor, the display screen 31, the storage unit 32 as a memory, and a second external interface communicably coupled to one another.

The second processor of the teaching apparatus 3 includes e.g. a CPU (Central Processing Unit), an FPGA (Field-Programmable Gate Array), and an ASIC (Application Specific Integrated Circuit).

The storage unit 32 includes e.g. a volatile memory such as a RAM (Random Access Memory) and a nonvolatile memory such as a ROM (Read Only Memory). Note that the memory is not limited to the undetachable type, but may be a detachable external storage device.

The second external interface includes various communication connectors. As examples, the external interface includes a USB (Universal Serial bus) connector, an RS-232C connector, and a wired LAN (Local Area Network). Or, the external interface may be a transceiver that enables wireless communication such as a wireless LAN.

The teaching apparatus 3 may include another hardware component element in addition to the above described component elements.

In the above described robot system 100, the coupling port 87 as the acquisition portion of the control apparatus 8 acquires and stores information on the operation mode input by the operator in the storage unit 82. Then, the velocity setting unit 85 sets the upper limit velocity according to the acquired operation mode. Specifically, when the operation mode acquired by the coupling port 87 is the execution mode for execution of the motion program, the velocity setting unit 85 sets the upper limit velocity to the first velocity V1. Or, when the operation mode acquired by the coupling port 87 is the teaching mode for teaching the motion program to the robot 2, the velocity setting unit 85 sets the upper limit velocity to the second velocity V2 lower than the first velocity V1.

According to the configuration, a case where the distance between the robot 2 and the operator is shorter as in the teaching mode is assumed and the upper limit velocity is set to the second velocity V2. In a case where increase in work efficiency is necessary at a certain level of safety as in the execution mode, the upper limit velocity is set to the first velocity V1 higher than the second velocity V2. That is, whether driving with the highest priority on safety or driving to increase the work efficiency with the minimum safety may be set according to the acquired operation mode. Therefore, regardless of the acquired operation mode, the safety may be sufficiently secured and the work efficiency may be increased.

Note that, as described above, the first velocity V1 refers to the maximum velocity of the control point TCP or the joint of the robot arm 20 and is preferably from 100 mm/sec to 500 mm/sec and more preferably from 150 mm/sec to 450 mm/sec.

The second velocity V2 refers to the maximum velocity of the control point TCP or the joint of the robot arm 20 like the first velocity V1 and is preferably from 10 mm/sec to 100 mm/sec and more preferably from 20 mm/sec to 50 mm/sec.

The first velocity V1 and the second velocity V2 are set within the above described numerical ranges, and thereby, regardless of the acquired operation mode, the safety may be secured more reliably and the work efficiency may be increased more reliably.

The values of the first velocity V1 and the second velocity V2 may be stored in the storage unit 82 in advance or can be appropriately set from the teaching apparatus 3 or another device.

The robot arm 20 includes the first arm 22 rotating about the first axis O1, the second arm 23 coupled to the first arm 22 and rotating about the second axis O2 parallel to the first axis O1, and the third arm 24 coupled to the second arm 23, rotating about the third axis O3 parallel to the first axis O1, and moving along the third axis O3. Further, it is preferable that the upper limit velocity of the rotation of the first arm 22 is lower than the upper limit velocity of the rotation of the second arm 23. Thereby, the upper limit velocity of the rotation of the first arm 22 having a larger contribution rate to the movement velocity of the control point TCP can be suppressed and the second arm 23 can be rotated faster than the upper limit velocity of the rotation of the first arm 22. Therefore, the safety may be secured and the work efficiency may be increased more effectively.

As described above, the robot system 100 includes the robot arm 20, the drive control unit 81 that controls driving of the robot arm 20 based on the operation mode executed by the robot arm 20, and the velocity setting unit 85 that sets the upper limit velocity of the motion velocity of the robot arm 20 based on the operation mode. Further, the velocity setting unit 85 sets the upper limit velocity to the first velocity V1 when the operation mode is the execution mode in which the motion program is executed and sets the upper limit velocity to the second velocity V2 lower than the first velocity V1 when the operation mode is the teaching mode in which the motion program is taught to the robot 2. Thereby, whether driving with the highest priority on safety or driving to increase the work efficiency with the minimum safety may be set according to the acquired operation mode. Therefore, regardless of the acquired operation mode, the safety may be sufficiently secured and the work efficiency may be increased.

Next, an example of the control method for the robot system 100 will be explained according to the flowchart shown in FIG. 4. Note that the steps to be described are performed by the control apparatus 8, however, may be shared with the teaching apparatus 3.

First, at step S100, the power of the robot system 100 is turned ON. That is, the power of the control apparatus 8 and the teaching apparatus 3 is turned ON. Here, the operator inputs the operation mode using the teaching apparatus 3.

Then, at step S101, information on the operation mode, i.e., whether the operation mode is the execution mode or the teaching mode is acquired from the teaching apparatus 3 and stored in the storage unit 82. The step S101 is an acquisition step of acquiring the operation mode.

Then, at step S102, whether or not the object detection unit 6 is coupled to the sensor port 86 is determined. As described above, the method of the determination includes e.g. a method of transmitting an electric signal to the sensor port 86 by the monitoring unit 84 and making the determination based on whether or not the electric signal is returned from the object detection unit 6 and a method of making the determination based on whether or not a resistance value of a resistor (not shown) changes. The step S102 is the coupling determination step.

At step S102, when no coupling is determined, as will be described later, the process moves to step S110.

At step S102, when coupling is determined, whether or not the object detection unit 6 has an abnormality is determined at step S103. The determination is made based on a signal from the abnormality sensor 60. At step S103, when an abnormality in the object detection unit 6 is determined, as will be described later, the process moves to step S111.

At step S103, when no abnormality in the object detection unit 6 is determined, presence or absence of an object approaching the robot 2 is determined based on the detection result acquired from the object detection unit 6 at step S104. This step S104 is an approach determination step. At step S104, when presence of an object approaching the robot 2 is determined, the process moves to step S112, which will be described later.

At step S104, when absence of an object approaching the robot 2 is determined, the absence of an object approaching the robot 2 is reported to the drive control unit 81 at step S105. Then, at step S106, an instruction to drive in a normal mode is given to the drive control unit 81.

The normal mode refers to a mode in which the robot arm 20 is driven at the upper limit velocity of the robot arm 20 set to the third velocity V3 higher than the first velocity V1. That is, there is no object, particularly, a human or the like approaching the robot arm 20, and thus, the robot arm 20 can be driven at a normal velocity. When no human is present close to the robot 2, lowering of the work efficiency may be prevented by driving of the robot arm 20 at the normal upper limit velocity.

Note that the normal mode is applied to either of the execution mode or the teaching mode. At step S106, an instruction to execute the execution mode and the teaching mode according to the operation mode input at step S101 is given to the drive control unit 81. Then, at step S107, the upper limit velocity is set to the third velocity V3 and the drive control unit 81 executes the operation program in the setting.

Then, at step S108, whether or not the power of the robot system 100 is turned OFF is determined. That is, whether or not an instruction to turn OFF the power is given from the operator is determined. At step S108, turning OFF of the robot system 100 is determined, at step S109, the power of the robot system 100 is turned OFF. On the other hand, at step S108, not turning OFF of the robot system 100 is determined, the process returns to step S103 and the subsequent steps are sequentially repeated.

Here, at step S102, when the determination that the object detection unit 6 is not coupled to the sensor port 86 is made, the process moves to step S110. At step S110, no coupling of the object detection unit 6 to the sensor port 86 is reported to the drive control unit 81. Then, the process moves to step S113.

Further, at step S103, the determination that the object detection unit 6 coupled to the sensor port 86 has an abnormality, the process moves to step S111. At step S111, an abnormality in the object detection unit 6 coupled to the sensor port 86 is reported to the drive control unit 81. Then, the process moves to step S113.

At step S113, whether or not the operation mode being currently selected is the execution mode or the teaching mode is determined. The determination is performed based on the operation mode acquired from the teaching apparatus 3 at step S101. At step S113, when the execution mode is determined, the upper limit velocity of the robot arm 20 is set to the first velocity V1 at step S114. Then, at step S115, the execution mode is executed at the first velocity V1 as the upper limit velocity.

On the other hand, at step S113, when the teaching mode is determined, the upper limit velocity of the robot arm 20 is set to the second velocity V2 lower than the first velocity V1 at step S116. Then, at step S117, the teaching mode is executed at the second velocity V2 as the upper limit velocity.

The above described step S114 and step S116 are a setting step of setting the upper limit value of the motion velocity of the robot arm 20.

At the setting step, as described above, the upper limit velocity of the control point TCP or the upper limit velocity of the joint of the robot arm 20 is set. The control point TCP and the joint of the robot arm 20 are the parts that tend to be the fastest of the robot 2. The upper limit velocities are set for the parts and executed, and thereby, the safety may be secured more reliably.

After the execution of these steps S115 and S117, the process moves to the above descried step S108 and the subsequent steps are repeated.

As described above, the control method according to the present disclosure is the control method for the robot system 100 having the robot arm 20 and executing the operation mode of the robot arm 20 having the execution mode in which the motion program is executed and the teaching mode in which the motion program is taught. Further, in the control method according to the present disclosure, when the operation mode is the execution mode, the upper limit velocity of the motion velocity of the robot arm 20 is set to the first velocity V1 and, when the operation mode is the teaching mode, the upper limit velocity is set to the second velocity V2 lower than the first velocity V1. Thereby, whether driving with the highest priority on safety or driving to increase the work efficiency with the minimum safety may be set according to the acquired operation mode. Therefore, regardless of the acquired operation mode, the safety may be sufficiently secured and the work efficiency may be increased.

Further, the control method has the acquisition step of acquiring the operation mode of the robot 2 and the setting step of setting the upper limit velocity of the motion velocity of the robot arm according to the operation mode specified at the acquisition step.

The method has the coupling determination step of determining whether or not the object detection unit 6 that detects an object approaching the robot 2 is coupled to the robot system 100 before the execution of the setting step and, when the determination that the object detection unit 6 is not coupled to the robot system 100 is made at the coupling determination step, the setting step is executed. That is, whether or not an object approaches the robot 2 is not detectable, the setting step is executed. Thereby, the safety may be further increased.

When the determination that the object detection unit 6 is coupled to the robot system 100 is made at the coupling determination step, the approach determination step of determining presence or absence of an object approaching the robot is executed based on the detection result of the object detection unit 6. Thereby, an approach of an object to the robot 2 may be detected.

When presence of an object approaching the robot 2 is determined at the approach determination step, the setting step is executed. Thereby, the safety may be increased.

When absence of an object approaching the robot 2 is determined at the approach determination step, the upper limit velocity of the robot arm 20 is set to the third velocity V3 higher than the first velocity V1. Thereby, the robot arm 20 may be driven at the third velocity V3 after confirmation of the safety, and the work efficiency may be increased.

As above, the control method and the robot system according to the present disclosure are explained based on the illustrated embodiments, however, the present disclosure is not limited to those. The requirements of the respective steps may be replaced by arbitrary steps having the same functions. Further, the configurations of the respective parts of the robot system may be replaced by arbitrary configurations having the same functions. Furthermore, other arbitrary configurations and steps may be respectively added to the control method and the robot system.

What is claimed is:

1. A control method for a robot system having a robot and a robot arm for causing a processor to execute a process, the control method comprising executing on the processor the steps of:
   acquiring an operation mode of the robot, the operation mode having an execution mode in which a motion program is executed and a teaching mode in which the motion program is taught;
   executing the operation mode of the robot;
   determining whether an object detection sensor is coupled to the robot system, the object detection sensor detecting an object approaching the robot;
   setting an upper limit velocity of a motion velocity of the robot arm to a first velocity when the acquired operation mode is the execution mode and the processor determines that the object detection sensor is not coupled to the robot system; and
   setting the upper limit velocity to a second velocity lower than the first velocity when the acquired operation mode is the teaching mode and the processor determines that the object detection sensor is not coupled to the robot system.

2. The control method according to claim 1, wherein the processor is further configured to cause the object detection sensor to detect present or absence of the object approaching the robot when the processor determines that the object detection sensor is coupled to the robot system.

3. The control method according to claim 2, wherein the processor is further configured to:
   set the upper limit velocity to the first velocity when the acquired operation mode is the execution mode, the processor determines that the object detection sensor is coupled to the robot system, and the object detection sensor detects the present of the object approaching the robot; and
   set the upper limit velocity to the second velocity when the acquired operation mode is the teaching mode, the processor determines that the object detection sensor is coupled to the robot system, and the object detection sensor detects the present of the object approaching the robot.

4. The control method according to claim 2, wherein
the processor is further configured to set the upper limit velocity to a third velocity higher than the first velocity when the acquired operation mode is the execution mode, the processor determines that the object detection sensor is coupled to the robot system, and the object detection sensor detects the absence of the object approaching the robot.

5. The control method according to claim 1, wherein
the upper limit velocity is one of a first upper limit velocity of a control point of the robot arm or a second upper limit velocity of a joint of the robot arm.

6. A robot system comprising:
a robot having a robot arm; and
a processor configured to be programed to:
   acquire an operation mode of the robot, the operation mode having an execution mode in which a motion program is executed and a teaching mode in which the motion program is taught;
   execute the operation mode of the robot;
   determining whether an object detection sensor is coupled to the robot system, the object detection sensor detecting an object approaching the robot;
   set an upper limit velocity of a motion velocity of the robot arm to a first velocity when the acquired operation mode is the execution mode and the processor determines that the object detection sensor is not coupled to the robot system; and
   set the upper limit velocity to a second velocity lower than the first velocity when the acquired operation mode is the teaching mode and the processor determines that the object detection sensor is not coupled to the robot system.

7. The robot system according to claim 6, wherein
the upper limit velocity includes a first arm upper limit velocity and a second arm upper limit velocity,
the robot arm includes a first arm rotating about a first axis, a second arm coupled to the first arm and rotating about a second axis parallel to the first axis, and a third arm coupled to the second arm, rotating about a third axis parallel to the first axis, and moving along the third axis, and
the first arm upper limit velocity of the rotation of the first arm is lower than the second arm upper limit velocity of the rotation of the second arm.

8. The robot system according to claim 6, wherein
the processor is further configured to be programed to cause the object detection sensor to detect present or absence of the object approaching the robot when the processor determines that the object detection sensor is coupled to the robot system.

9. The robot system according to claim 8, wherein
the processor is further configured to be programed to:
   set the upper limit velocity to the first velocity when the acquired operation mode is the execution mode, the processor determines that the object detection sensor is coupled to the robot system, and the object detection sensor detects the present of the object approaching the robot; and
   set the upper limit velocity to the second velocity when the acquired operation mode is the teaching mode, the processor determines that the object detection sensor is coupled to the robot system, and the object detection sensor detects the present of the object approaching the robot.

10. The robot system according to claim 8, wherein
the processor is further configured to be programed to set the upper limit velocity to a third velocity higher than the first velocity when the acquired operation mode is the execution mode, the processor determines that the object detection sensor is coupled to the robot system, and the object detection sensor detects the absence of the object approaching the robot.

11. The robot system according to claim 6, wherein
the upper limit velocity is one of a first upper limit velocity of a control point of the robot arm or a second upper limit velocity of a joint of the robot arm.

* * * * *